(12) United States Patent
Hong

(10) Patent No.: US 12,543,222 B2
(45) Date of Patent: Feb. 3, 2026

(54) METHOD FOR RANDOM ACCESS COMMUNICATION DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 510 days.

(21) Appl. No.: 18/013,896

(22) PCT Filed: Jul. 14, 2020

(86) PCT No.: PCT/CN2020/101821
§ 371 (c)(1),
(2) Date: Dec. 29, 2022

(87) PCT Pub. No.: WO2022/011541
PCT Pub. Date: Jan. 20, 2022

(65) Prior Publication Data
US 2023/0292365 A1    Sep. 14, 2023

(51) Int. Cl.
*H04W 76/16* (2018.01)
*H04W 74/0833* (2024.01)
*H04W 74/0836* (2024.01)

(52) U.S. Cl.
CPC ....... *H04W 76/16* (2018.02); *H04W 74/0833* (2013.01); *H04W 74/0836* (2024.01)

(58) Field of Classification Search
None
See application file for complete search history.

(56) References Cited

U.S. PATENT DOCUMENTS 9,426,828 B1 *   8/2016   Singh .................... H04W 72/54
10,448,429 B2 * 10/2019   Lee ....................... H04W 72/21
(Continued)

FOREIGN PATENT DOCUMENTS

CN    104640212 A    5/2015
CN    109511156 A    3/2019
(Continued)

OTHER PUBLICATIONS

Search Report issued in EP application No. 20945283.8 dated Feb. 15, 2024, (29p).
(Continued)

*Primary Examiner* — Faiyazkhan Ghafoerkhan
(74) *Attorney, Agent, or Firm* — Arch & Lake LLP; Hao Tan; Shen Wang

(57) ABSTRACT

A method for random access includes: selecting, by a user equipment, a random access preamble from a group of random access preambles corresponding to a multi-modal communication and performing, by the user equipment, a random access of the multi-modal communication. Another method for random access includes: receiving, by an access network device, a random access request; and determining, by the access network device, whether a random access is initiated based on a multi-modal communication, according to a random access preamble carried in the random access request.

18 Claims, 7 Drawing Sheets

(56) References Cited

U.S. PATENT DOCUMENTS

| | | | | |
|---|---|---|---|---|
| 2012/0287800 | A1* | 11/2012 | Siomina | H04W 64/003 |
| | | | | 370/252 |
| 2014/0126530 | A1* | 5/2014 | Siomina | H04L 5/0073 |
| | | | | 370/330 |
| 2016/0248555 | A1* | 8/2016 | Lei | H04L 27/26025 |
| 2016/0323916 | A1* | 11/2016 | Lee | H04W 76/10 |
| 2017/0367120 | A1* | 12/2017 | Murray | H04B 7/0695 |
| 2020/0022187 | A1* | 1/2020 | Bergström | H04W 48/16 |
| 2023/0292365 | A1* | 9/2023 | Hong | H04W 74/0833 |

FOREIGN PATENT DOCUMENTS

| | | |
|---|---|---|
| CN | 109511175 A | 3/2019 |
| WO | 2018137512 A1 | 8/2018 |

OTHER PUBLICATIONS

INOA issued in application No. 202347006621 dated Mar. 15, 2024 with English translation, (7p).

Xiaomi, "Study on the Support for Multi-modality Interaction," 3GPP TSG-SA WG1 Meeting #90-e E-meeting, S1-202286, May 18-22, 2020, (3p).

International Search Report of PCT/CN2020/101821 dated Apr. 16, 2021 with English translation, (4p).

LG Electronics Inc., "Further discussion on preamble group selection", 3GPP TSG-RAN WG2 #109e, R2-2001510, Mar. 6, 2020, (4p).

* cited by examiner

METHOD FOR RANDOM ACCESS COMMUNICATION DEVICE, AND STORAGE MEDIUM

CROSS-REFERENCE TO RELATED APPLICATION

This application is a national phase of International Application No. PCT/CN2020/101821 filed on Jul. 14, 2020, the entire content of which is incorporated herein by reference for all purposes.

TECHNICAL FIELD

The disclosure relates to the field of wireless communication technologies, and particularly to, a method for random access, a communication device, and a storage medium.

BACKGROUND

Smart interaction scenarios in the field of communications may be considered as communication technologies developed. Smart interactions relate to interactions between smart agents. The agents include but not limited to a person and a smart device.

Smart interactions make an interaction scenario more complex, an interaction range involved wider, and resources required for interaction more.

SUMMARY

According to a first aspect of the disclosure, a method for random access is provided. The method includes: selecting a random access preamble from a group of random access preambles corresponding to a multi-modal communication and performing a random access of the multi-modal communication.

According to a second aspect of the disclosure, a method for random access is provided. The method includes: receiving a random access request; and determining whether a random access is initiated based on a multi-modal communication, based on a random access preamble carried in the random access request.

According to a third aspect of the disclosure, a communication device is provided. The device includes: a processor, a transceiver, a memory, and an executable program stored on the memory and capable of being run by the processor, in which when the processor runs the executable program, the method as described in any technical solution of the first aspect and/or the second aspect is executed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure.

Terms used in embodiments of the disclosure are merely for describing specific examples and are not intended to limit the embodiments of the disclosure. The singular forms "one", "the", and "this" used in the embodiments of the disclosure and the appended claims are also intended to include a multiple form, unless other meanings are clearly represented in the context. It should also be understood that the term "and/or" used in the disclosure refers to any or all of possible combinations including one or more associated listed items.

It should be understood that although terms "first", "second", "third", and the like are used in embodiments of the disclosure to describe various information, the information is not limited to the terms. These terms are merely used to differentiate information of a same type. For example, without departing from the scope of the embodiments of the disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
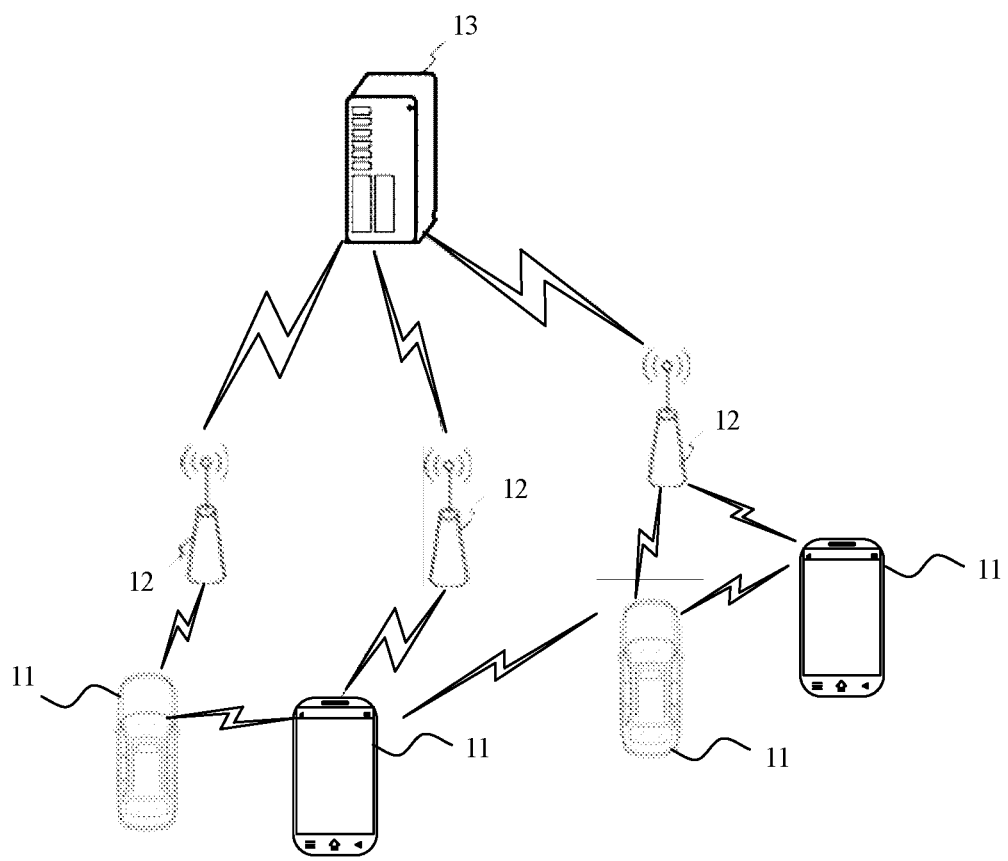
FIG. 1 is a diagram illustrating a structure of a wireless communication system according to some embodiments.

Referring to FIG. 1, FIG. 1 is a diagram illustrating a structure of a wireless communication system according to some embodiments of the disclosure. As illustrated in FIG.

1, the wireless communication system is a communication system based on a cellular mobile communication technology. The wireless communication system includes several UEs 11 and several base stations 12.

The UE 11 may refer to a device that provides voice and/or data connectivity for a user. The UE 11 may communicate with one or more core networks through a radio access network (RAN). The UE 11 may be an internet of things (IoT) UE, for example, a sensor device, a mobile phone (or referred to as a cellular phone), and a computer having an internet of things UE, such as a fixed, portable, compact, handheld, computer built-in or vehicle-mounted device. For example, a station (STA), a subscriber unit, a subscriber station, a mobile station, a mobile, a remote station, an access point, a remote terminal, an access terminal, a user terminal, a user agent, a user device, or a user equipment (UE). Or, the UE 11 may be a device of an unmanned aerial vehicle. Or, the UE 11 also may be a vehicle-mounted device, for example, a vehicle computer with a wireless communication function, or a wireless communication device externally connected to a vehicle computer. Or, the UE 11 also may be a roadside device, for example, a street lamp, a signal lamp, or other roadside device with a wireless communication function.

The base station 12 may be a network side device in the wireless communications system. The wireless communication system may be a fourth generation (4G) mobile communication system, also referred to as a long-term evolution (LTE) system; or the wireless communications system may be a fifth generation (5G) mobile communication system, also referred to as a new radio (NR) system or a 5G NR system. Or, the wireless communication system may be a next generation system of the 5G system. An access network in the 5G system may be referred to as a new generation-radio access network (NG-RAN). Or, it is a machine type communication (MTC) system.

The base station 12 may be an evolved node base station (eNB) used in the 4G system. Alternatively, the base station 12 may also be a next generation node base station (gNB) adopting a centralized and distributed architecture in the 5G system. When the base station 12 adopts the centralized and distributed architecture, it usually includes a central unit (CU) and at least two distributed units (DUs). The central unit is provided with a protocol stack of a packet data convergence protocol (PDCP) layer, a radio link control (RLC) layer, and a media access control (MAC) layer. The distributed unit is provided with a protocol stack of a physical (PHY) layer. Embodiments of the disclosure may not limit the implementation manner of the base station 12.

A wireless connection may be established between the base station 12 and UE 11 through a wireless air interface. In different embodiments, the wireless air interface may be a wireless air interface based on the 4G standard; or, the wireless air interface may be a wireless air interface based on the 5G standard, such as the wireless air interface is a new air interface; or the wireless air interface may be a wireless air interface based on the next generation mobile communication network technology standard following the 5G standard.

In some embodiments, an end to end (E2E) link may also be established between the UEs 11, for example, a vehicle to vehicle (V2V) communication, a vehicle to infrastructure (V2I) communication, and a vehicle to pedestrian (V2P) communication in a vehicle to everything (V2X) communication.

In some embodiments, the above wireless communication system may also include a network management device 13.

The base stations 12 are coupled to the network management device 13 respectively. The network management device 13 may be a core network device in the wireless communication system. For example, the network management device 13 may be a mobility management entity (MME) of an evolved packet core (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 13 is not limited in embodiments of the disclosure.

Most interactions in the communication field depend on inputs of demands, such as voice and/or visual interactions between human and smart home. Based on forms of inputs, data may be divided into single-modal inputs and multi-modal inputs. With the further development of smart interactions, more humanized and intelligent multi-modal inputs will become normal. The multi-modal inputs relate to inputs of a plurality of devices or a plurality of inputs of one device, which are sent to a processing device for comprehensive processing, to finally satisfy service requirements in different interaction scenarios, for example, to generate one or a plurality of outputs. The plurality of outputs may be outputs of a plurality of devices or a plurality of outputs of one device.

Figure 2:
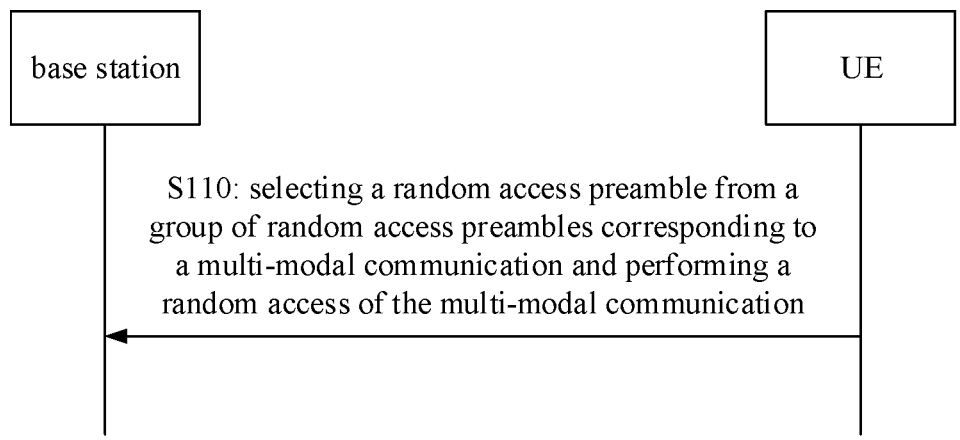
FIG. 2 is a flowchart illustrating a method for random access according to some embodiments.

As illustrated in FIG. 2, a method for random access is provided in embodiments of the disclosure, which includes the following.

At S110, a random access preamble is selected from a group of random access preambles corresponding to a multi-modal communication and a random access of the multi-modal communication is performed.

The method for random access may be applied to a UE.

The multi-modal communication may be a communication involving a multi-modal service. The multi-modal service may be a communication service provided based on different inputs in the same scenario.

When the UE performs the random access based on providing or acquiring a trigger of a plurality of modalities, the random access may be performed using the random access preamble corresponding to the multi-modal service.

The random access preamble corresponding to the multi-modal communication is different from the random access preamble corresponding to the single-modal communication.

For example, the multi-modal communication is generated by UE(s) based on inputs of a plurality of modalities of user(s). The inputs of the plurality of modalities may include: a mixture of inputs of a text input, a voice input, an image input, and/or a manual input such as pressing and/or touching of a physical device such as a mouse or keyboard or a touch panel.

The inputs may be used in the same scenario for a particular service.

For example, in a video conference of a meeting room, there are image inputs and voice inputs. Also, there may be text inputs such as passwords or fingerprint image inputs such as fingerprints, if authentication is required. The multi-modal inputs are intended to provide video conference services.

The multi-modal inputs may be completed independently through input acquisition and data feedback of inputs by a device that supports the multi-modal inputs or may be completed jointly by a multi-modal communication providing system consisting of a plurality of devices, for example, a camera acquires images, a microphone that is independent from the camera acquires voice, a PC keyboard acquires text inputs.

The multi-modal communication triggered by the multi-modal inputs is generally characterized by many types of data transmitted and a large data volume, compared with the single-modal communication triggered by the single-modal inputs. In this case, in order to distinguish the random access of the single-modal communication triggered by the single-modal inputs, the network side needs to treat them differently, to reduce a multi-modal communication failure or a large delay caused by the random accesses of part of devices for the same multi-mode communication being rejected.

The random access preamble for performing the multi-modal communication may be different from the random access preamble for performing the single-modal communication in at least one of: different random access preambles formed in the same generation method; and different types of random access preambles formed in different generation methods, for example, random access preambles generated by an algorithm A and an algorithm B.

In some embodiments, the distinction between the random access preamble corresponding to the multi-modal communication and the random access preamble corresponding to the single-modal communication may be reflected in at least one of the following.

A length of the random access preamble corresponding to the multi-modal communication is different from a length of the random access preamble corresponding to the single-modal communication. For example, a number of bits occupied by a sequence corresponding to the random access preamble of the single-modal communication is not equal to a number of bits occupied by a sequence corresponding to the random access preamble of the multi-modal communication.

A composition of the random access preamble corresponding to the multi-modal communication is different from a composition of the random access preamble corresponding to the single-modal communication. For example, a composition of a character string of the random access preamble corresponding to the single-modal communication includes numbers; and a composition of a character string of the random access preamble corresponding to the multi-modal communication includes numbers and/or letters.

A format of the random access preamble corresponding to the multi-modal communication is different from a format of the random access preamble corresponding to the single-modal communication. For example, compositions of sequences of random access preambles corresponding to the two communications may be same or different, and lengths of sequences or lengths of character strings of random access preambles corresponding to the two communications may be same or different. In this case, formats of random access preambles corresponding to the two communications are different for distinguishing. The length of the random access preamble is 2M. The composition of the random access preamble for the single-modal communication is that first M bits may be a bit sequence in a first predetermined range and last M bits may be a bit sequence in a second predetermined range. The composition of the random access preamble for the multi-modal communication is that first M bits may be a bit sequence in a second predetermined range and last M bits may be a bit sequence in a first predetermined range.

In embodiments of the disclosure, the random access may include a two-step random access and/or a four-step random access.

In any case, different random access preambles are set for the single-modal communication and the multi-modal communication respectively, so that the random access preambles carried in the random access requests for the random accesses are different, and after the device corresponding to the current random access request is directly distinguished based on the random access preamble carried in the random access request and accesses the network, the network side may perform the single-modal random access request and/or the multi-modal random access request.

In some embodiments, in order that the network side distinguishes the same type of random accesses initiated by different devices, identity information is carried in the random access request for the random access during the random access. The identity information may facilitate the network side to determine which random access requests are initiated by the plurality of devices involved in the same multi-modal communication.

For example, there is a certain association relationship among devices that initiate the multi-modal communication. Generally, in an initial access or in an attachment process, information of a device may be reported, and based on the information, the network side may be informed of a device group where the device is located or may be informed of an associated device of the device. When a plurality of devices that may initiate the multi-modal communication carry identity information in the random access requests, the network side may distinguish the multi-modal communication initiated by different devices well at the same moment.

The identity information may be a communication group identifier of a device group including a plurality of devices; and/or, an association identifier associated with a plurality of devices.

For example, the identity information is carried in message A in the two-step random access, which is only exemplary herein and facilitates the network side to distinguish the random accesses of different multi-modal communications initiated at the same time.

In other embodiments, the identity information may be a password dynamically generated when the random access of the multi-modal communication is initiated, so that a plurality of devices for the multi-modal communication do not need to be associated in advance or are not limited to be located in a group. For example, a password is negotiated among a plurality of devices for performing the same multi-modal communication. The password is carried in the random access request, and the network side also may distinguish the random access of which device is the random access request initiated by the device belonging to the same multi-modal communication based on the password.

For another example, considering particularity of the random access of the multi-modal communication, concurrency of the same multi-modal communication at the same time may be ignored, and the single-modal communication may be directly distinguished through the random access preamble.

In other embodiments, considering geographical distribution of a plurality of devices involved in one multi-modal communication, location information may be carried in the random access request for the random access, the location information indicating a current location of the device. The subsequent network side considers a plurality of devices at the same current location or within the difference preset range as a plurality of devices involved in the same multi-modal communication based on the centralized geographic distribution of the plurality of devices for initiating the same multi-modal communication.

In embodiments of the disclosure, for the random access initiated by the multi-modal communication, the random access request is sent using the random access preamble for the multi-modal communication. When the network side receives the random access request, on one hand, the random access request for the single-modal communication may be distinguished, and on the other hand, all random access requests of one multi-modal communication may be simultaneously rejected or simultaneously responded in response to determining whether to respond to the random access requests, which reduces the phenomenon that part of random access requests of one multi-modal communication are responded and the random accesses successfully occupy resources, but the other part of random access requests are rejected and the corresponding multi-modal communication may not be provided, thereby reducing resource waste caused by part of random accesses of one multi-modal communication being responded and the other part of random accesses being rejected and a large overall delay of the multi-modal communication due to the excessive part of response and partial rejection.

In some embodiments, S110 may include: selecting the random access preamble from the group of random access preambles corresponding to the multi-modal communication and performing the random access of the multi-modal communication.

The multi-modal communication may refer to the random accesses of a plurality of devices. Therefore, random access preambles are configured for the multi-modal communication in the manner of the group(s) of random access preambles.

One multi-modal communication has one or more groups of random access preambles.

One group of random access preambles includes one or more random access preambles corresponding to the multi-modal communication.

Random access preamble(s) may be selected from the same group of random access preambles for random access(s) in response to the multi-modal communication having a plurality of groups of random access preambles.

For example, one multi-modal communication requires N devices for random accesses. In order to facilitate the base station side to identify N devices for the same multi-modal communication, random access preambles are preferentially selected from one group of random access preambles in the plurality of groups of random access preambles corresponding to the multi-modal communication for accessing, and subsequently, random accesses of the N devices are simultaneously accepted or random accesses of the N devices are simultaneously rejected in response to determining that the random accesses of the plurality of devices are random accesses belonging to the same multi-modal communication. N is any positive integer, for example, N is a positive integer greater than or equal to 2.

When one multi-modal communication only has one group of random access preambles, the random access preamble for the multi-modal communication of the single device or random access preambles for the multi-modal communication of the plurality of devices, may be selected from the group of random access preambles for the random access.

A number of random access preambles included in the plurality of groups of random access preambles for the multi-modal communication may be the same or different. For example, a number of devices involved in one type of multi-modal communication may be floating. In this case, when the numbers of random access preambles of the plurality of groups of random access preambles of the multi-modal communication are different, the UE may preferentially select a group of random access preambles consistent to the number of UEs involved, for the random access. For example, when the number of devices involved in one multi-modal communication is M, a group of random access preambles with a number of random access codes not less than M and with a smallest difference of M, is selected for the random access.

In some embodiments, different multi-modal communications have different groups of random access preambles.

In order to distinguish different multi-modal communications, different groups of random access preambles are configured for different multi-modal communications, so that the network side may determine which random access requests belong to the same multi-modal communication based on the random access preambles of the group of random access preambles carried in the random access requests, thereby determining whether to uniformly reject the random access requests of the same multi-modal communication or uniformly accept the random access requests belonging to the same multi-modal communication.

By configuring different groups of random access preambles for different multi-modal communications, when different multi-modal communications are performed at the UE side, random accesses may be performed by the random access preambles belonging to different groups of random access preambles, which is convenient for the network side to distinguish.

In some embodiments, a number of random access preambles corresponding to the multi-modal communication is positively correlated with a number of devices involved in the multi-modal communication.

For random accesses of a plurality of devices involved in the same multi-modal communication, in order to distinguish different devices, the devices need to carry different random access preambles. And the numbers of devices that may be involved in different multi-modal communications are different, and in order to facilitate the random accesses of all devices related to the same multi-modal communication, more random access preambles are configured for the multi-modal communication.

For example, the number of devices involved in a multi-modal communication A is more than the number of devices involved in a multi-modal communication B. In this case, the number of random access preambles of the multi-modal communication A is greater than the number of random access preambles of the multi-modal communication B.

The configuration mode of the number of random access preambles for the multi-modal communication may satisfy the random access requirements of different multi-modal communications well.

In some embodiments, the number of the groups of random access preambles corresponding to the multi-modal communication is positively correlated with the concurrency number of the multi-modal communication. That is, the more the occurrence number of times of the multi-modal communication per unit time is, the more the number of groups of the random access preambles for the multi-modal communication is.

In some embodiments, the number of the groups of random access preambles corresponding to the multi-modal communication is positively correlated with the concurrency number of the multi-modal communication, and the number of random access preambles corresponding to the multi-modal communication is positively correlated with the number of devices involved in the multi-modal communication, so that the requirements of random access requests of multi-modal communications with different communication requirements may be satisfied.

Figure 3:
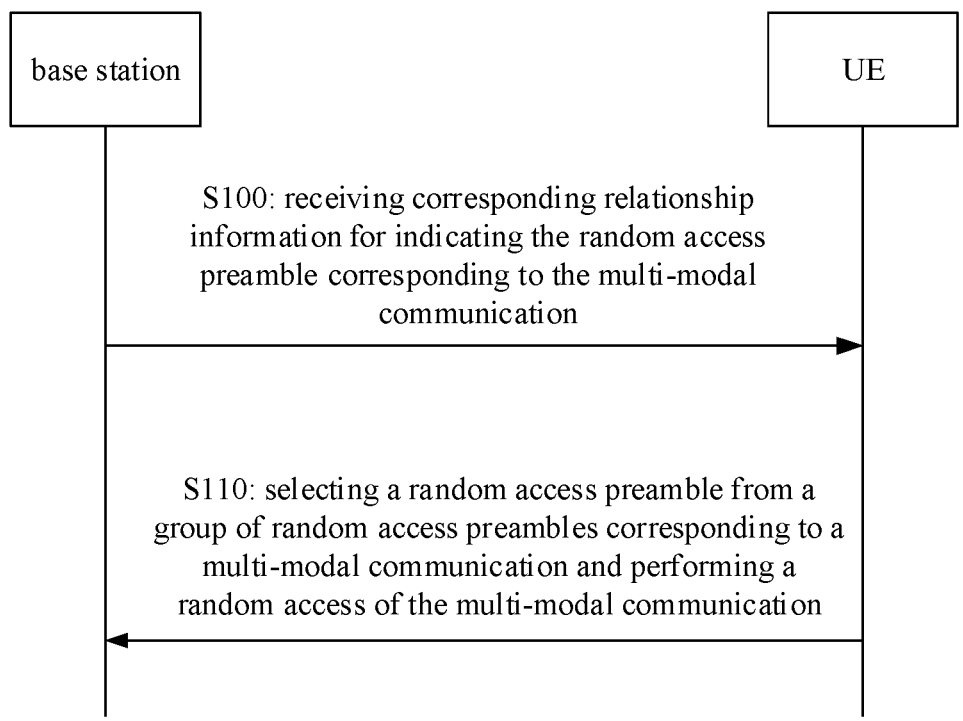
FIG. 3 is a flowchart illustrating a method for random access according to some embodiments.

In some embodiments, as illustrated in FIG. 3, the method further includes the following.

At S100, corresponding relationship information for indicating the random access preamble corresponding to the multi-modal communication is received.

Network access units (for example, various types of base stations or transmission-reception points TRPs)) at the network side may send the corresponding relationship information of the random access preamble corresponding to the multi-modal communication.

The corresponding relationship information indicates a corresponding relationship between different multi-modal communications and random access preambles. The UE may select the corresponding random access preamble for the random access during the multi-modal communication based on the corresponding relationship indicated by the corresponding relationship information when receiving the corresponding relationship information.

The corresponding relationship information may be sent in a unicast manner, a multicast manner, or a broadcast manner.

For example, the base station may broadcast a random access message in the cell, so that all UEs in the cell may receive the corresponding relationship information, which may reduce a number of times and a signaling overhead of sending the corresponding relationship information by the base station, compared with unicast sending.

For another example, the UE capable of performing the multi-modal communication needs to perform registration or subscription of the multi-modal communication at the network side. In this case, the network side knows which UEs may perform the multi-modal communication in advance. Therefore, the corresponding relationship information may be multicast in the devices in the cell. The UE only for the single-mode communication may not receive the corresponding relationship information, thereby reducing a signaling required to be received by the UE only for the single-modal communication.

In other embodiments, the corresponding relationship information may also be unicast to a corresponding UE by a unicast signaling such as a radio resource control (RRC) signaling.

Of course, the corresponding relationship information may also be pre-written into the UE, for example, the corresponding relationship information is pre-written into a communication protocol, so that there is no dedicated signaling for indicating the random access preamble for the multi-modal communication between the UE and the base station.

In some embodiments, the corresponding relationship information indicates: a corresponding relationship between a communication ID of the multi-modal communication and a group ID of a group of random access preambles where the random access preamble corresponding to the multi-modal communication is located; or a corresponding relationship between the communication ID of the multi-modal communication and a code ID of the random access preamble corresponding to the multi-modal communication.

Different multi-modal communications have different communication IDs, so that the corresponding relationship with the random access preambles may be constructed using the IDs.

The communication ID may be configured by the base station at the network side, configured by the core network device of the core network, or configured by an operation administration maintenance (OAM) of a communication network.

In embodiments of the disclosure, the corresponding relationship may be the communication ID and corresponding random access preambles. In embodiments of the disclosure, in order to facilitate configuration of corresponding relationship information, an ID may be configured for each random access preamble or a group ID may be configured for each group of random access preambles. In this case, the communication ID of the multi-modal communication and the ID of the random access preamble or the group ID of the group of random access preambles may be configured in the corresponding relationship information.

In embodiments of the disclosure, the corresponding relationship information includes: the communication ID of the multi-modal communication and the ID of the corresponding random access preamble; or, the communication ID of the multi-modal communication and the group ID of the corresponding group of random access preambles.

In some embodiments, the method further includes: receiving the communication ID allocated for the multi-modal communication.

The network side, by means of broadcast of the communication ID, may inform the UE which multi-modal communication needs the cell to support, on the other hand, when the UE receives the corresponding relationship information, may determine the random access preamble corresponding to the multi-modal communication.

In some embodiments, selecting the random access preamble from the group of random access preambles corresponding to the multi-modal communication and performing the random access of the multi-modal communication includes: selecting the same group of random access preambles for the random access in response to one multi-modal communications having a plurality of groups of random access preambles.

If one multi-modal communication is configured with a plurality of groups of random access preambles, and if random access preambles are preferentially selected for random accesses in one group of random access preambles, even if concurrency of the same multi-modal communication exists in the cell, it may be determined which random access requests are initiated by the devices for the same multi-modal communication based on the group of random access preambles which the random access preambles carried in the random access requests belong to.

In some embodiments, selecting the random access preamble from the group of random access preambles corresponding to the multi-modal communication and performing the random access of the multi-modal communication includes: selecting random access preambles within at least two groups of random access preambles for the random access in response to a number in one group of random access preambles being less than a number of devices involved in the multi-modal communication.

If one multi-modal communication has a plurality of groups of random access preambles, random access preambles may be selected from different groups of random access preambles in response to the random access preambles of a certain group of random access preambles being insufficient. For example, when there are two or three groups of random access preambles, random accesses may be performed within the two or three groups of random access preambles.

In some embodiments, the method includes: performing the random access using a random access preamble corresponding to a single-modal communication in response to all random access preambles of the multi-modal communication having been used by a device participating in the multi-modal communication.

If one multi-modal communication has a group of random access preambles, and when random access preambles in the group have been used by other devices, the current UE performs the random access by the random access preamble corresponding to the single-modal communication. If one multi-modal communication has groups of random access preambles, and when random access preambles in the current group of random access preambles have been used by other devices, the random access preamble may be selected from other groups of random access preambles of the multi-modal communication for random access, and when the random access preambles in other groups of random access preambles are consumed, the current UE may perform the random access by the random access preamble corresponding to the single-modal communication.

If the random access preambles corresponding to the multi-modal communication are consumed, the random access preamble of the single-modal communication may be temporarily borrowed for the random access, which reduces the delay of the random access request of the multi-modal communication and further reduces the delay of the multi-modal communication.

In some embodiments, the method further includes: suspending sending a random access request in response to the random access preamble corresponding to the single-modal communication having been used. That is, random access preambles of the multi-modal communication may not be occupied for the random access, which reduces acceptance or rejection due to the random access request of the single-modal communication being misunderstood by the network side as the random access request of the multi-modal communication.

Figure 4:
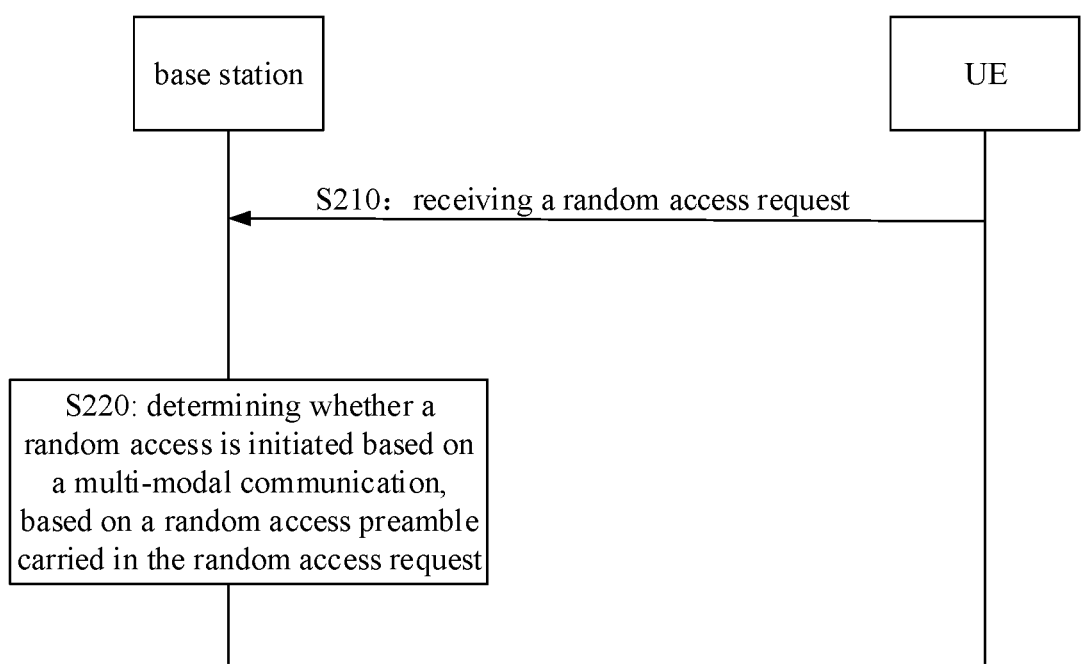
FIG. 4 is a flowchart illustrating a method for random access according to some embodiments.

As illustrated in FIG. 4, a method for random access is provided in embodiments of the disclosure, which includes the following.

At S210, a random access request is received.

At S220, whether a random access is initiated based on a multi-modal communication is determined based on a random access preamble carried in the random access request.

The method for random access provided in embodiments of the disclosure may be applied to various access devices such as base stations or TRPs.

The access device may receive the random access request, and determine whether a current willingness to initiate the random access request requires the multi-modal communication or the single-modal communication based on the random access preamble carried in the random access request.

In some embodiments, S220 may include: determining that the random access request is a random access initiated based on the multi-modal communication in response to the random access preamble carried in the random access request being a random access preamble corresponding to the multi-modal communication.

In another embodiment, S220 may include: determining that the random access request is a random access initiated based on the single-modal communication rather than a random access initiated based on the multi-modal communication in response to the random access preamble carried in the random access request being a random access preamble corresponding to the single-modal communication.

In some embodiments, the method further includes: sending corresponding relationship information between the multi-modal communication and the random access preamble.

In embodiments of the disclosure, an access device may send the corresponding relationship information for indicating the corresponding relationship between one or more multi-modal communications and the random access preambles.

Sending the corresponding relationship information between the multi-modal communication and the random access preamble includes: broadcasting the corresponding relationship information between the multi-modal communication and the random access preamble; or, multicasting the corresponding relationship information between the multi-modal communication and the random access preamble; or, unicasting the corresponding relationship information between the multi-modal communication and the random access preamble.

In some embodiments, the corresponding relationship information indicates: a corresponding relationship between a ID of the multi-modal communication and a group ID of a group of random access preambles where the random access preamble corresponding to the multi-modal communication is located; or, a corresponding relationship between the communication ID of the multi-modal communication and a code ID of the random access preamble corresponding to the multi-modal communication. In embodiments of the disclosure, the corresponding relationship information includes: the communication ID of the multi-modal communication and the ID of the corresponding random access preamble; or, the communication ID of the multi-modal communication and the group ID of the corresponding group of random access preambles.

In some embodiments, the method further includes: sending the communication ID of the multi-modal communication before sending the corresponding relationship information.

The communication ID may be configured by an OAM device or an access device in the above embodiments. The communication ID may be sent in any one of broadcast, multicast or unicast.

In some embodiments, one multi-modal communication has one or more groups of random access preambles; and one group of random access preambles includes one or more random access preambles corresponding to the multi-modal communication.

In some embodiments, different multi-modal communications have different groups of random access preambles.

In some embodiments, a number of random access preambles corresponding to the multi-modal communication is positively correlated with a number of devices involved in the multi-modal communication.

Figure 5:
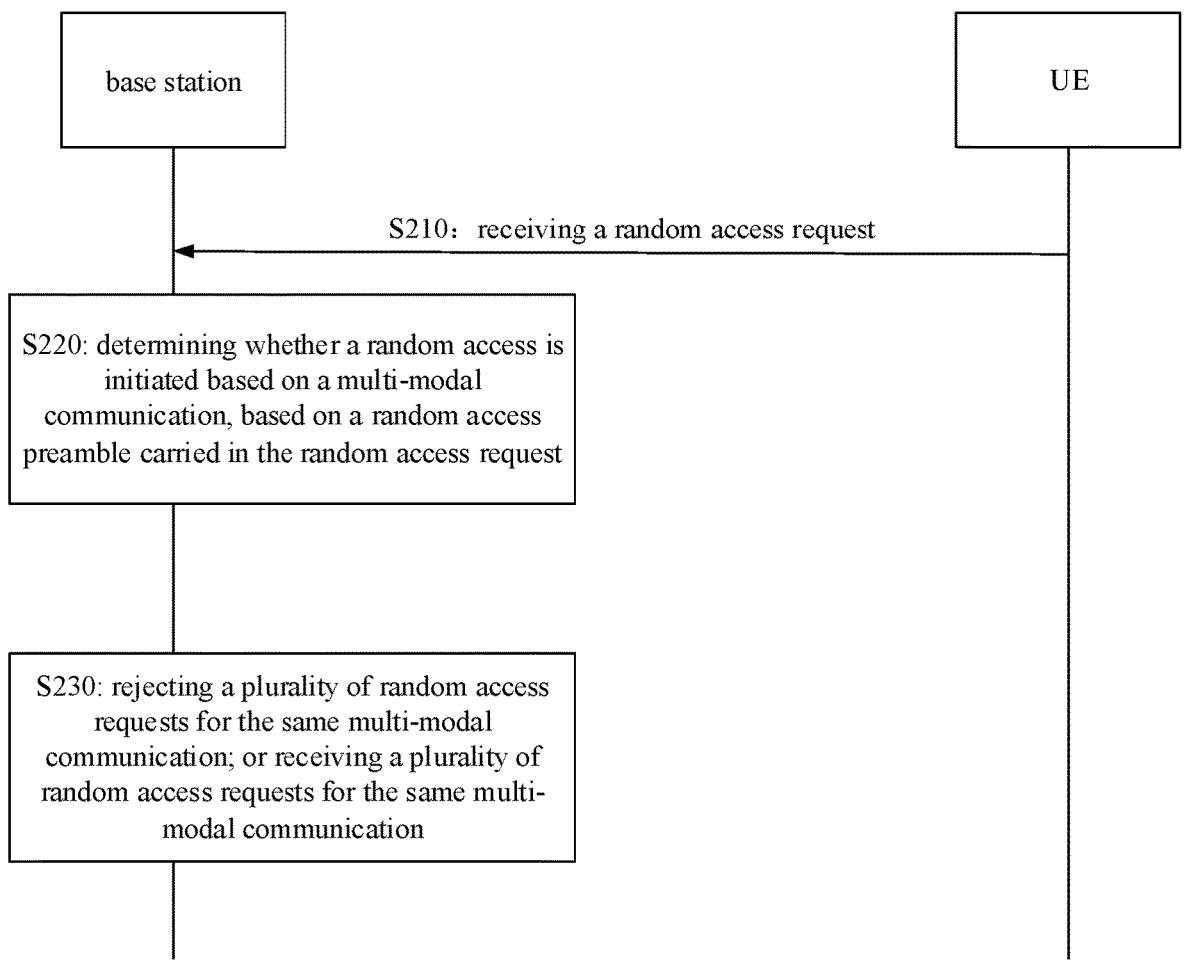
FIG. 5 is a flowchart illustrating a method for random access according to some embodiments.

In some embodiments, as illustrated in FIG. 5, the method further includes the following.

At S230, a plurality of random access requests for the same multi-modal communication are rejected; or a plurality of random access requests for the same multi-modal communication are received.

For example, an access device rejects or receives a random access request of a corresponding device based on a certain algorithm. However, in embodiments of the disclosure, the access device may accept or reject a plurality of random access requests for the multi-modal communication when rejecting or rejecting the random access request. The processing mode of the random access request may reduce a communication failure, a poor communication effect, or a large delay, caused due to the multi-modal communication being unable to be started synchronously caused by the random access requests of the same multi-modal communication initiated by a plurality of devices being partially accepted.

In technical solutions provided in embodiments of the disclosure, the random access preamble used in the random access of the multi-modal communication corresponds to the multi-modal communication, that is, the random access of the multi-modal communication and the random access of the single-modal communication may be performed using different random access preambles, so that the network side may distinguish the random access initiated based on the multi-modal communication or based on the single-modal communication when responding to the random access. Therefore, the network side responds to the random access of the single-modal communication or the multi-modal communication in a target manner.

Figure 6:
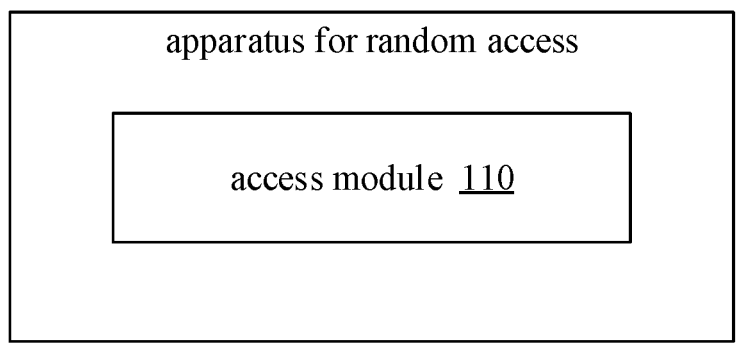
FIG. 6 is a diagram illustrating a structure of an apparatus for random access according to some embodiments.

As illustrated in FIG. 6, an apparatus for random access is provided in embodiments of the disclosure, which includes an access module 110.

The access module 110 is configured to select a random access preamble from a group of random access preambles corresponding to a multi-modal communication and perform a random access of the multi-modal communication.

In some embodiments, the access module 110 may be a program module; and the program module may perform the random access using the random access preamble corresponding to the multi-modal communication in response to the random access initiated by the multi-modal communication when executed by a processor.

In other embodiments, the access module 110 further may be a software and hardware combination module; the software and hardware combination module includes but not limited to various programmable arrays; and the programmable arrays include but not limited to complex programmable arrays or field programmable arrays.

In other embodiments, the access module 110 may further include a pure hardware module. The pure hardware module includes but not limited to various pure hardware circuits.

In other embodiments, the access module 110 is configured to select the random access preamble from the group of random access preambles corresponding to the multi-modal communication and perform the random access of the multi-modal communication.

In some embodiments, one multi-modal communication has one or more groups of random access preambles; and one group of random access preambles includes one or more random access preambles corresponding to the multi-modal communication.

In some embodiments, different multi-modal communications have different groups of random access preambles.

In some embodiments, a number of random access preambles corresponding to the multi-modal communication is positively correlated with a number of devices involved in the multi-modal communication.

In some embodiments, the apparatus further includes a first receiving module.

The first receiving module is configured to receive corresponding relationship information for indicating the random access preamble corresponding to the multi-modal communication.

In some embodiments, the corresponding relationship information indicates: a corresponding relationship between a communication ID of the multi-modal communication and a group ID of a group of random access preambles where the random access preamble corresponding to the multi-modal communication is located; or, a corresponding relationship between the communication ID of the multi-modal communication and a code ID of the random access preamble corresponding to the multi-modal communication.

In some embodiments, the first receiving module is further configured to receive the communication ID allocated for the multi-modal communication.

In some embodiments, the access module 110 is configured to select the same group of random access preambles for the random access in response to one multi-modal communications having a plurality of groups of random access preambles.

In some embodiments, the access module 110 is configured to select random access preambles within at least two groups of random access preambles for the random access in response to a number in one group of random access preambles being less than a number of devices involved in the multi-modal communication.

In some embodiments, the access module 110 is further configured to perform the random access using a random access preamble corresponding to a single-modal communication in response to all random access preambles of the multi-modal communication having been used by a device participating in the multi-modal communication.

Figure 7:
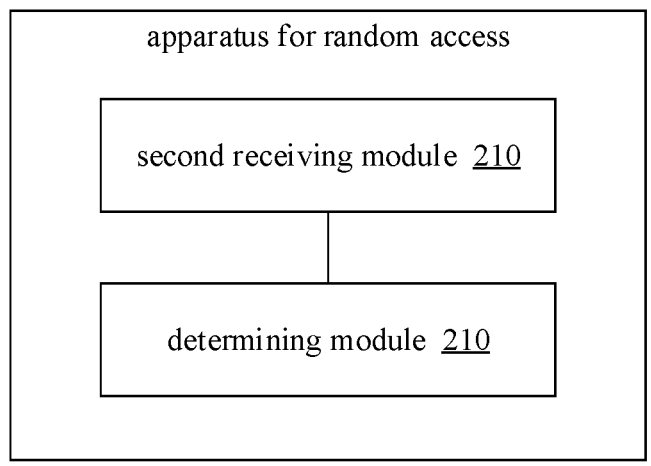
FIG. 7 is a diagram illustrating a structure of an apparatus for random access according to some embodiments.

As illustrated in FIG. 7, an apparatus for random access is further provided in embodiments of the disclosure, which includes a second receiving module 210 and a determining module 220.

The second receiving module 210 is configured to receive a random access request.

The determining module 220 is configured to determine whether a random access is initiated based on a multi-modal communication, based on a random access preamble carried in the random access request.

In some embodiments, the second receiving module 210 and the determining module 220 may be program modules; and the program modules may perform the random access using the random access preamble corresponding to the multi-modal communication in response to the random access initiated by the multi-modal communication when executed by the processor.

In other embodiments, the second receiving module 210 and the determining module 220 further may be software and hardware combination modules; the software and hardware combination modules include but not limited to various programmable arrays; and the programmable arrays include but not limited to complex programmable arrays or field programmable arrays.

In other embodiments, the second receiving module 210 and the determining module 220 further may be pure hardware modules. The pure hardware modules include but not limited to various pure hardware circuits.

In some embodiments, the apparatus further includes a sending module.

The sending module is configured to send corresponding relationship information between the multi-modal communication and the random access preamble.

In some embodiments, the corresponding relationship indicates: a corresponding relationship between a ID of the multi-modal communication and a group ID of a group of random access preambles where the random access preamble corresponding to the multi-modal communication is located; or, a corresponding relationship between the communication ID of the multi-modal communication and a code ID of the random access preamble corresponding to the multi-modal communication.

In some embodiments, the sending module is configured to send the communication ID of the multi-modal communication before sending the corresponding relationship information.

In some embodiments, one multi-modal communication has one or more groups of random access preambles; and one group of random access preambles includes one or more random access preambles corresponding to the multi-modal communication.

In some embodiments, different multi-modal communications have different groups of random access preambles.

In some embodiments, a number of random access preambles corresponding to the multi-modal communication is positively correlated with a number of devices involved in the multi-modal communication.

In some embodiments, the apparatus further includes a response module.

The response module is configured to reject a plurality of random access requests for the same multi-modal communication; or receive a plurality of random access requests for the same multi-modal communication.

An example is provided in combination with the above any embodiment:

In methods in embodiments of the disclosure, the base station may allow a plurality of accesses of the multi-modal inputting devices so that a centralized processing device or function may receive the required multi-modal inputs for processing in time.

According to embodiments of the disclosure, a method for accessing of a multi-modal device is further provided, which may include: the base station reserving one or more groups of random access preambles for a multi-modal communication or service.

Each group has one or more random access preambles.

Which multi-modal communications or services may be configured for the base station through the OAM, and random access preambles to be reserved corresponding to each multi-modal communication or service also may be simultaneously configured.

The ID corresponding to each multi-modal communication or service may be specified. Each ID corresponds to a group of random access preambles. The UE and base station may map and understand based on the regulation.

The base station may broadcast a corresponding relationship between the multi-modal communication or service and the ID.

The base station may broadcast a corresponding relationship between the multi-modal communication or service and the random access preamble.

Different multi-modal communications or services may set with different groups of random access preambles, for example, the number of random access preambles in the group of random access preambles corresponding to the multi-modal communication or service with a high requirement for the number of input devices is high.

When a certain multi-modal inputting UE desires to access a network, the corresponding random access preamble may be selected for the random access based on the multi-modal communication or service initiated to initiate the random access.

A plurality of multi-modal inputting UEs for the same multi-modal communication or service preferentially select preambles in the same group to initiate the random accesses.

The base station learns that the random access is for the multi-modal communication or service when receiving the preamble corresponding to the certain multi-modal communication or service. In this case, whether to allow the random access may be decided based on a certain algorithm.

A communication device is provided in embodiments of the disclosure, which includes: a processor, a transceiver, a memory, and an executable program stored on the memory and capable of being run by the processor. When the processor runs the executable program, the method for random access applied to the UE provided in the above any technical solution is executed, or the method for random access applied to the base station provided in the above any technical solution is executed.

The communication device may be the above base station or UE.

The processor may include various types of storage mediums. The storage medium is a non-transitory computer storage medium and may continue memorizing and storing information thereon when the communication device is powered off. The communication device includes the base station or the UE.

The processor may be connected to the memory by a bus and may be configured to read the executable program stored on the memory, for example, at least one of methods as illustrated in FIG. 2 to FIG. 5.

A computer storage medium stored with an executable program is provided in embodiments of the disclosure. When the executable program is caused executed by a processor, the method as described in the first aspect or in second aspect is performed, for example, at least one of methods as illustrated in FIG. 2 to FIG. 5.

Figure 8:
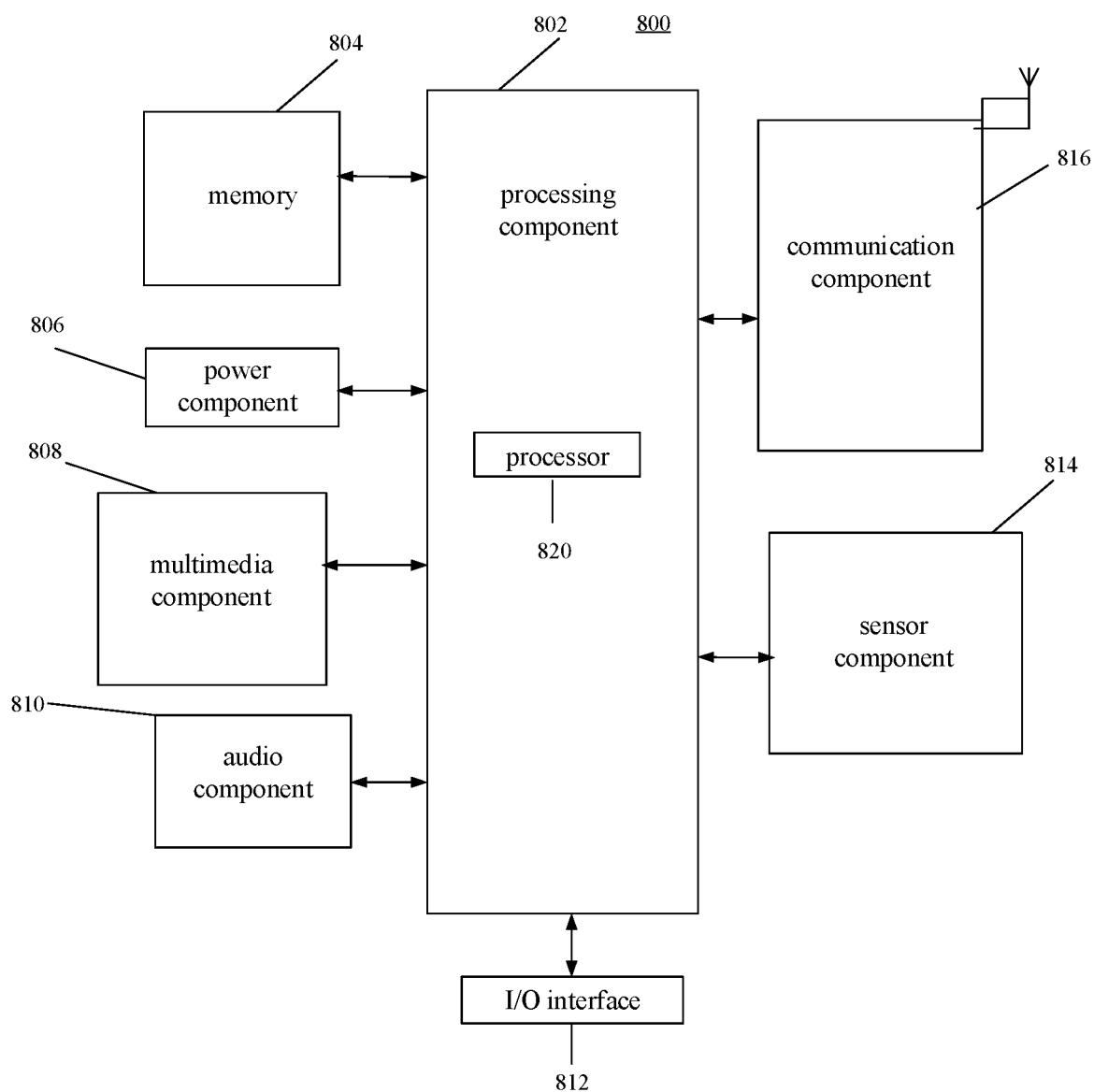
FIG. 8 is a diagram illustrating a structure of a user equipment (UE) according to some embodiments.

FIG. 8 is a block diagram illustrating a UE 800 according to some embodiments. For example, the UE 800 may be a mobile phone, a computer, a digital broadcast terminal, a messaging device, a gaming console, a tablet, a medical device, exercise equipment, a personal digital assistant, and the like.

Referring to FIG. 8, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the UE 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as Wi-Fi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the UE 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 804, executable by the processor 820 in the UE 800, for performing the above-described methods. For example, the non-transitory computer-readable storage medium may be a ROM, a RAM, a CD-ROM, a magnetic tape, a floppy disc, an optical data storage device, and the like.

Figure 9:
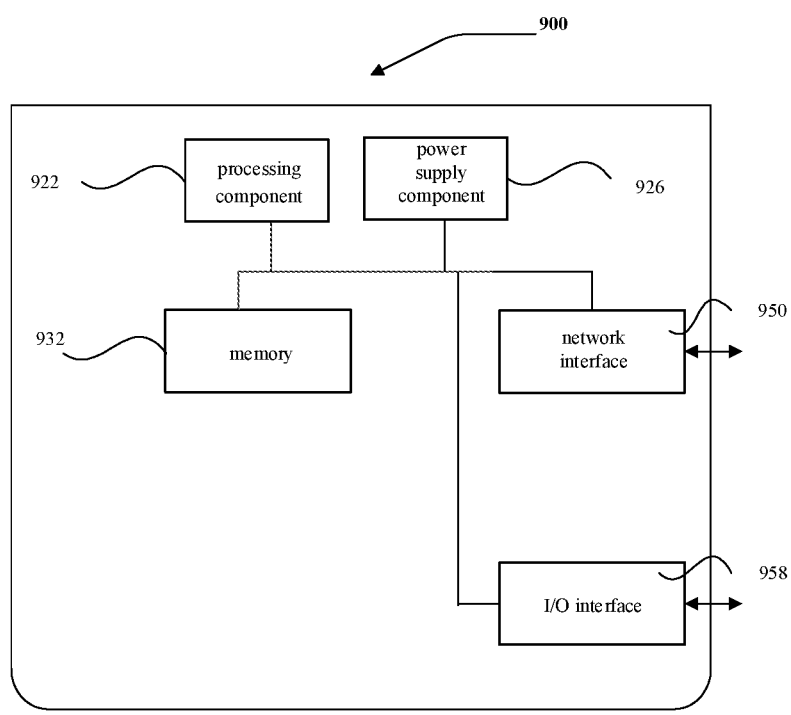
FIG. 9 is a diagram illustrating a structure of a base station according to some embodiments.

FIG. 9 is a block diagram illustrating a structure of a base station according to some embodiments of the disclosure. For example, the base station 900 may be provided as a network side server. As illustrated in FIG. 9, the base station 900 includes a processing component 922, which further include one or more processors, and memory resources represented by a memory 932, which are configured to store instructions executable by the processing component 922, for example, an application. The application stored in the memory 932 may include one or more modules each of which corresponds to a set of instructions. In addition, the processing component 922 is configured to execute instructions, to execute any method applied to the base station as described in the above methods, for example, methods as illustrated in FIGS. 2 to 5.

The base station 900 may further include a power supply component 926 configured to execute power management of the base station 900, a wired or wireless network interface 950 configured to connect the base station 900 to a network, and a I/O interface 958. The base station 900 may operate an operating system stored in the memory 932, for example, Windows Server™, Mac OS X™, Unix™, Linux™, FreeBSD™, or the like.

Other embodiments of the disclosure will be apparent to those skilled in the art from consideration of the specification and practice of the disclosure disclosed herein. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

According to a first aspect of the disclosure, a method for random access is provided. The method includes: selecting a random access preamble from a group of random access preambles corresponding to a multi-modal communication and performing a random access of the multi-modal communication.

In some embodiments, selecting the random access preamble from the group of random access preambles corresponding to the multi-modal communication and performing the random access of the multi-modal communication comprises: selecting the random access preamble from the group of random access preambles corresponding to the multi-modal communication and performing the random access of the multi-modal communication.

In some embodiments, one multi-modal communication has one or more groups of random access preambles; and one group of random access preambles comprises one or more random access preambles corresponding to the multi-modal communication.

In some embodiments, different multi-modal communications have different groups of random access preambles.

In some embodiments, a number of random access preambles corresponding to the multi-modal communication is positively correlated with a number of devices involved in the multi-modal communication.

In some embodiments, the method further comprises: receiving corresponding relationship information for indicating the random access preamble corresponding to the multi-modal communication.

In some embodiments, the corresponding relationship information indicates: a corresponding relationship between a communication ID of the multi-modal communication and a group ID of a group of random access preambles where the random access preamble corresponding to the multi-modal communication is located; or, a corresponding relationship between the communication ID of the multi-modal communication and a code ID of the random access preamble corresponding to the multi-modal communication.

In some embodiments, the method further comprises: receiving the communication ID allocated for the multi-modal communication.

In some embodiments, selecting the random access preamble from the group of random access preambles corresponding to the multi-modal communication and performing the random access of the multi-modal communication comprises: selecting the same group of random access preambles for the random access in response to one multi-modal communications having a plurality of groups of random access preambles.

In some embodiments, selecting the random access preamble from the group of random access preambles corresponding to the multi-modal communication and performing the random access of the multi-modal communication comprises: selecting random access preambles within at least two groups of random access preambles for the random access in response to a number in one group of random access preambles being less than a number of devices involved in the multi-modal communication.

In some embodiments, the method comprises: performing the random access using a random access preamble corresponding to a single-modal communication in response to all random access preambles of the multi-modal communication having been used by a device participating in the multi-modal communication.

According to a second aspect of the disclosure, a method for random access is provided. The method includes: receiving a random access request; and determining whether a random access is initiated based on a multi-modal communication, based on a random access preamble carried in the random access request.

In some embodiments, the method further comprises: sending corresponding relationship information between the multi-modal communication and the random access preamble.

In some embodiments, the corresponding relationship indicates: a corresponding relationship between a ID of the multi-modal communication and a group ID of a group of random access preambles where the random access preamble corresponding to the multi-modal communication is located; or, a corresponding relationship between the communication ID of the multi-modal communication and a code ID of the random access preamble corresponding to the multi-modal communication.

In some embodiments, the method further comprises: sending the communication ID of the multi-modal communication before sending the corresponding relationship information.

In some embodiments, one multi-modal communication has one or more groups of random access preambles; and one group of random access preambles comprises one or more random access preambles corresponding to the multi-modal communication.

In some embodiments, different multi-modal communications have different groups of random access preambles.

In some embodiments, a number of random access preambles corresponding to the multi-modal communication is positively correlated with a number of devices involved in the multi-modal communication.

In some embodiments, the method further comprises: rejecting a plurality of random access requests for the same multi-modal communication; or, receiving a plurality of random access requests for the same multi-modal communication.

According to a third aspect of the disclosure, an apparatus for random access is provided. The apparatus includes: an access module, configured to select a random access preamble from a group of random access preambles corresponding to a multi-modal communication and perform a random access of the multi-modal communication.

In some embodiments, the access module is configured to select the random access preamble from the group of random access preambles corresponding to the multi-modal communication and perform the random access of the multi-modal communication.

In some embodiments, one multi-modal communication has one or more groups of random access preambles; and one group of random access preambles comprises one or more random access preambles corresponding to the multi-modal communication.

In some embodiments, different multi-modal communications have different groups of random access preambles.

In some embodiments, a number of random access preambles corresponding to the multi-modal communication is positively correlated with a number of devices involved in the multi-modal communication.

In some embodiments, the apparatus further comprises: a first receiving module, configured to receive corresponding relationship information for indicating the random access preamble corresponding to the multi-modal communication.

In some embodiments, the corresponding relationship information indicates: a corresponding relationship between a communication ID of the multi-modal communication and a group ID of a group of random access preambles where the random access preamble corresponding to the multi-modal communication is located; or, a corresponding relationship between the communication ID of the multi-modal communication and a code ID of the random access preamble corresponding to the multi-modal communication.

In some embodiments, the first receiving module is further configured to receive the communication ID allocated for the multi-modal communication.

In some embodiments, the access module is configured to select the same group of random access preambles for the random access in response to one multi-modal communications having a plurality of groups of random access preambles.

In some embodiments, the access module is configured to select random access preambles within at least two groups of random access preambles for the random access in response to a number in one group of random access preambles being less than a number of devices involved in the multi-modal communication.

In some embodiments, the access module is further configured to perform the random access using a random access preamble corresponding to a single-modal communication in response to all random access preambles of the multi-modal communication having been used by a device participating in the multi-modal communication.

According to a fourth aspect of the disclosure, an apparatus for random access is provided. The apparatus includes: a second receiving module, configured to receive a random access request; and a determining module, configured to determine whether a random access is initiated based on a multi-modal communication, based on a random access preamble carried in the random access request.

In some embodiments, the apparatus further comprises: a sending module, configured to send corresponding relationship information between the multi-modal communication and the random access preamble.

In some embodiments, the corresponding relationship indicates: a corresponding relationship between a ID of the multi-modal communication and a group ID of a group of random access preambles where the random access preamble corresponding to the multi-modal communication is located; or, a corresponding relationship between the communication ID of the multi-modal communication and a code ID of the random access preamble corresponding to the multi-modal communication.

In some embodiments, the sending module is configured to send the communication ID of the multi-modal communication before sending the corresponding relationship information.

In some embodiments, one multi-modal communication has one or more groups of random access preambles; and one group of random access preambles comprises one or more random access preambles corresponding to the multi-modal communication.

In some embodiments, different multi-modal communications have different groups of random access preambles.

In some embodiments, a number of random access preambles corresponding to the multi-modal communication is positively correlated with a number of devices involved in the multi-modal communication.

In some embodiments, the apparatus further comprises: a response module, configured to reject a plurality of random access requests for the same multi-modal communication; or receive a plurality of random access requests for the same multi-modal communication.

According to a fifth aspect of the disclosure, a communication device is provided. The device includes: a processor, a transceiver, a memory, and an executable program stored on the memory and capable of being run by the processor, in which when the processor runs the executable program, the method as described in any technical solution of the first aspect and/or the second aspect is executed.

According to a sixth aspect of the disclosure, a computer storage medium stored with an executable program is provided; in which when the executable program is executed by a processor, the method as described in any technical solution of the first aspect or the second aspect is performed.

The invention claimed is:

1. A method for random access, comprising:
    selecting, by a user equipment, a random access preamble from a group of random access preambles corresponding to a multi-modal communication and performing, by the user equipment, a random access of the multi-modal communication,
    wherein a number of random access preambles corresponding to the multi-modal communication is positively correlated with a number of devices involved in the multi-modal communication.

2. The method as claimed in claim 1, wherein:
    one multi-modal communication comprises one or more groups of random access preambles; and
    one group of random access preambles comprises one or more random access preambles corresponding to the multi-modal communication.

3. The method as claimed in claim 2, wherein different multi-modal communications have different groups of random access preambles.

4. The method as claimed in claim 1, further comprising:
    receiving corresponding relationship information for indicating the random access preamble corresponding to the multi-modal communication.

5. The method as claimed in claim 4, wherein the corresponding relationship information indicates at least one of:
    a corresponding relationship between a communication ID of the multi-modal communication and a group ID of a group of random access preambles where the random access preamble corresponding to the multi-modal communication is located; or
    a corresponding relationship between the communication ID of the multi-modal communication and a code ID of the random access preamble corresponding to the multi-modal communication.

6. The method as claimed in claim 5, further comprising:
    receiving the communication ID allocated for the multi-modal communication.

7. The method as claimed in claim 1, wherein selecting the random access preamble from the group of random access preambles corresponding to the multi-modal communication and performing the random access of the multi-modal communication comprises:
    selecting a same group of random access preambles for the random access in response to one multi-modal communications having a plurality of groups of random access preambles.

8. The method as claimed in claim 7, wherein selecting the random access preamble from the group of random access preambles corresponding to the multi-modal communication and performing the random access of the multi-modal communication comprises:
    selecting random access preambles within at least two groups of random access preambles for the random access in response to a number in one group of random access preambles being less than a number of devices involved in the multi-modal communication.

9. The method as claimed in claim 1, comprising:
    performing the random access using a random access preamble corresponding to a single-modal communication in response to all random access preambles of the multi-modal communication having been used by a device participating in the multi-modal communication.

10. A method for random access, comprising:
receiving, by an access network device, a random access request; and
determining, by the access network device, whether a random access is initiated based on a multi-modal communication, according to a random access preamble carried in the random access request,
wherein a number of random access preambles corresponding to the multi-modal communication is positively correlated with a number of devices involved in the multi-modal communication.

11. The method as claimed in claim 10, further comprising:
sending corresponding relationship information between the multi-modal communication and the random access preamble.

12. The method as claimed in claim 11, wherein the corresponding relationship indicates at least one of:
a corresponding relationship between a ID of the multi-modal communication and a group ID of a group of random access preambles where the random access preamble corresponding to the multi-modal communication is located; or
a corresponding relationship between the communication ID of the multi-modal communication and a code ID of the random access preamble corresponding to the multi-modal communication.

13. The method as claimed in claim 12, further comprising:
sending the communication ID of the multi-modal communication before sending the corresponding relationship information.

14. The method as claimed in claim 13, wherein:
one multi-modal communication has one or more groups of random access preambles; and
one group of random access preambles comprises one or more random access preambles corresponding to the multi-modal communication.

15. The method as claimed in claim 14, wherein different multi-modal communications have different groups of random access preambles.

16. The method as claimed in claim 10, further comprising at least one of:
rejecting a plurality of random access requests for the same multi-modal communication; or
receiving a plurality of random access requests for the same multi-modal communication.

17. A communication device, comprising:
a processor;
a transceiver;
a memory; and
an executable program stored on the memory and capable of being run by the processor,
wherein, the processor is configured to run the executable program to:
select a random access preamble from a group of random access preambles corresponding to a multi-modal communication and perform a random access of the multi-modal communication,
wherein a number of random access preambles corresponding to the multi-modal communication is positively correlated with a number of devices involved in the multi-modal communication.

18. A non-transitory computer-readable storage medium having stored therein instructions that, when executed by a processor of a user equipment, causes the user equipment to perform the method of claim 1.

* * * * *